No. 825,300. PATENTED JULY 10, 1906.
S. E. BURKE.
AUTOMOBILE CLIMBER.
APPLICATION FILED JULY 31, 1905.
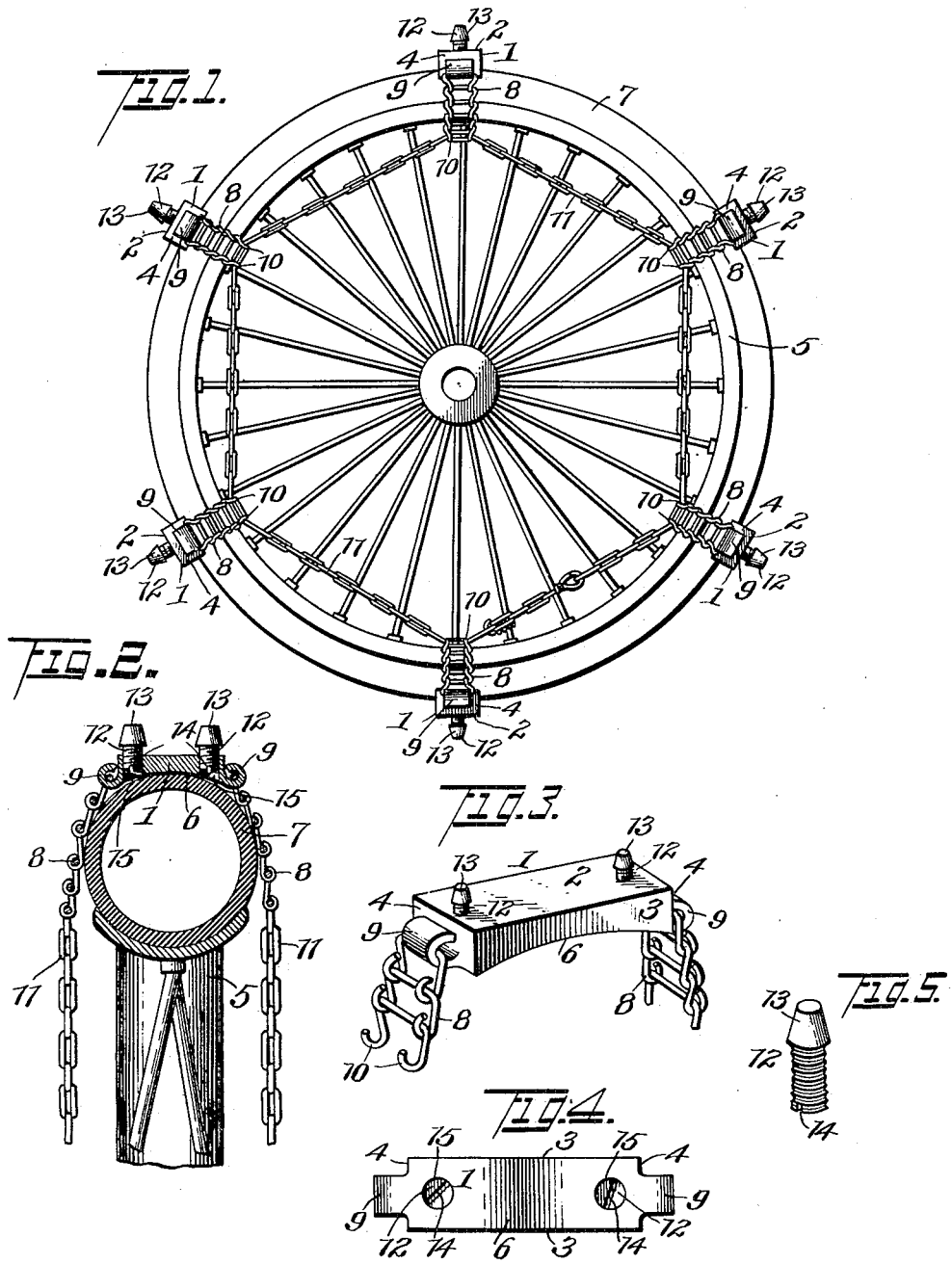
Stephen E. Burke, Inventor

UNITED STATES PATENT OFFICE.

STEPHEN E. BURKE, OF BUTLER, INDIANA.

AUTOMOBILE-CLIMBER.

No. 825,300.　　　　Specification of Letters Patent.　　　　Patented July 10, 1906.

Application filed July 31, 1905. Serial No. 272,064.

*To all whom it may concern:*

Be it known that I, STEPHEN E. BURKE, a citizen of the United States, residing at Butler, in the county of Dekalb and State of Indiana, have invented a new and useful Automobile-Climber, of which the following is a specification.

The invention relates to improvements in attachments for horseless vehicles for enabling the wheels thereof to grip the ground or other supporting-surface firmly to prevent the wheels from slipping when traveling over slippery roads, ice, and when ascending or descending steep inclines.

The object of the present invention is to provide a simple and comparatively inexpensive device of great strength and durability adapted when applied to the wheels of a horseless vehicle to permit the tire to expand and contract, and thereby avoid interfering with the easy running of such vehicles.

A further object of the invention is to provide a device of this character capable of effectually preventing the wheels of a vehicle from sliding or skidding and provided with adjustable means for engaging ice and other slippery surfaces.

Another object of the invention is to provide a gripping device or shoe adapted to readily fit the vehicle-wheels of different sizes and kinds and capable of enabling a small number of gripping devices or shoes to prevent a wheel from slipping.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a wheel provided with a series of gripping members or shoes constructed in accordance with this invention. Fig. 2 is a transverse sectional view of a portion of the wheel. Fig. 3 is a detail perspective view of one of the gripping shoes or members. Fig. 4 is a reverse plan view of the same. Fig. 5 is a detail perspective view of one of the adjustable calks.

Like numerals of reference designate corresponding parts in all the figures of the drawings.

1 designates a substantially oblong gripping-shoe consisting of a bar or piece constructed of steel or other suitable material and having a flat outer face 2 and provided with straight side and end edges or faces 3 and 4, forming shoulders for preventing a wheel 5 from sliding or skidding. The side and end edges 3 and 4 are angular, being arranged substantially at right angles to each other and to the flat outer face 2 of the shoe. The gripping member or shoe has a smooth concavely-curved inner face 6, adapted to fit against a tread of a pneumatic or other tire 7, and it is disposed transversely of the tread of the tire and is provided with flexible connections 8, preferably consisting of chains, as illustrated in the accompanying drawings. By providing a smooth concave inner face and flexible connections the gripping member or shoe is adapted to be applied to various kinds and sizes of wheels, and it is capable of permitting the tire to be compressed at the bottom of the wheel and to expand and contract, whereby the gripping member or shoe will not interfere with the easy running of a vehicle.

The gripping member or shoe is provided at its ends with a pair of reduced projecting eyes 9, preferably consisting of integral lips or flanges rolled into approximately cylindrical form and linked into the outer ends of the chains 8. The reduced projecting eyes 9 are of a size less than the end faces 4 and do not interfere with the operation of the end faces in preventing a wheel from slipping. The short chains 8, which extend to points within the rim of the wheel, are provided with terminal hooks 10 or other suitable means for engaging a pair of chains 11, which are located at opposite sides of the wheel, as clearly indicated in Fig. 2 of the drawings, and which are provided at their ends with suitable means for connecting the same. The chains 8 and 11 may be of any desired construction, and they are adapted to securely retain the gripping members or shoes on the rim of the wheel, and they are also adapted to permit the gripping members or shoes to be readily removed when they are not required. The eyes 9 are arranged in the same plane as the inner face of the gripping member or shoe and are thereby adapted to rest on the tire.

In order to effectually prevent the wheels from slipping when a vehicle is traveling over the ice or other slippery surfaces, the gripping member or shoe is provided with a pair of adjustable calks 12, consisting of screws provided with outer tapered heads or portions 13 and provided at their inner ends with grooves 14, adapted to be engaged by the blade of a screw-driver for adjusting the calks. The threaded portions of the calks are arranged in threaded openings 15, which extend entirely through the gripping member or shoe and which are located adjacent to the ends thereof, as clearly shown in Figs. 2 and 3 of the drawings. The calks are adjusted from the inner face of the gripping member or shoe, and the wearing of the outer engaging portions or heads will not affect the grooves 14, and by arranging the said grooves 14 at the inner ends of the calks they are not liable to become clogged with dirt or other accumulation. By adjusting the calks their outer engaging ends may be made to project to a greater or less extent according to the character of the surface over which a machine is traveling.

The device, which is exceedingly simple and inexpensive in construction, possesses great strength and will last a considerable length of time. Owing to the side and end shoulders and the projecting calks, only a few of the devices will be required for each wheel of a vehicle. As the sides of the device formed by the chains 8 are flexible, the device may be readily applied to all kinds of tires and will not interfere with the expansion and contraction of the tire and the consequent easy running of a vehicle.

Having thus fully described my invention, what I claim as new, and desire to secure by Letters Patent, is—

1. In a device of the class described, the combination of a gripping member or shoe, consisting of a bar formed of a single piece and disposed transversely of and resting against the tread of a wheel, adjustable calks carried by the bar and projecting from the outer face of the same, short flexible connections located at opposite sides of the rim of the wheel and secured to the ends of the gripping member or shoe and adapted to permit a tire to expand and contract freely, and means connected with the flexible connections for retaining the device on the wheel.

2. In a device of the class described, the combination of a gripping member or shoe consisting of a bar formed of a single piece provided with a flat outer face and having side and end shoulders, said bar being adapted to extend transversely of the tread of a wheel, short flexible connections secured to the ends of the bar and extending around the tire and rim to points beyond the latter, and means connected with the flexible connections between the rim and the hub for retaining the gripping member or shoe on a wheel.

3. In a device of the class described, the combination of a gripping member or shoe consisting of a bar or piece having a threaded opening extending entirely through it, and an adjustable calk consisting of a screw having a groove at its inner end and provided at its outer end with a projecting engaging portion or head extending from the outer face of the gripping member or shoe.

4. The combination of a gripping member or shoe, consisting of a bar adapted to extend transversely of the tread of a wheel and provided at its ends with threaded openings, adjustable calks consisting of screws mounted in the threaded openings of the gripping member or shoe and located at opposite sides of the center of the tread, and means for retaining the gripping member or shoe on the tread of the wheel.

5. In a device of the class described, the combination of a series of gripping members or shoes, each consisting of a substantially straight bar formed of a single piece and having a slightly-curved inner face and arranged to fit against and extend transversely of the tread of a wheel, a pair of flexible connections for each shoe located at opposite sides of the rim of the wheel and secured to the ends of the bar and extending inward at the sides of the tire to points beyond the rim, and means for connecting the flexible connections at each side of the wheel.

6. In a device of the class described, the combination of a gripping member or shoe consisting of a bar adapted to extend transversely of the tread of a wheel, short chains secured to the ends of the bar and provided at their inner terminals with hooks, and chains engaging the said hooks and located at opposite sides of a wheel between the rim and the hub for retaining the gripping member or shoe on the tread of the wheel.

7. In a device of the class described, the combination of a gripping member or shoe consisting of a bar formed of a single piece and adapted to extend transversely of the tread of a wheel and provided with a flat outer face and angular side and end edges forming shoulders for preventing the wheel from slipping or skidding, said bar being also provided at its ends with integral eyes, which are in the same plane as the inner face of the bar, so as to rest on the tire, and detachable calks carried by the gripping member or shoe and located at opposite sides of the center thereof, and means connected with the eyes for retaining the gripping member or shoe on the tread of a wheel.

8. In a device of the class described, the combination of a gripping member or shoe, consisting of a bar formed of a single piece with a flat outer face and having side and end shoulders, said bar being adapted to extend transversely of the tread of a wheel, adjustable calks carried by the bar and projecting from the outer face thereof, and means for retaining the gripping member or shoe on a wheel.

In testimony that I claim the foregoing as my own I have hereto affixed my signature in the presence of two witnesses.

STEPHEN E. BURKE.

Witnesses:
CURTIS W. BEECHLER.
CASSIUS J. COATS.